(12) United States Patent
Doerr

(10) Patent No.: US 7,324,726 B2
(45) Date of Patent: Jan. 29, 2008

(54) DISPERSION COMPENSATION APPARATUS

(75) Inventor: Christopher R Doerr, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 62 days.

(21) Appl. No.: 11/164,644

(22) Filed: Nov. 30, 2005

(65) Prior Publication Data
US 2007/0122082 A1 May 31, 2007

(51) Int. Cl.
*G02B 6/34* (2006.01)
*G02B 6/26* (2006.01)
*G02B 6/42* (2006.01)

(52) U.S. Cl. ............... 385/37; 385/15; 385/16; 385/23; 385/31; 385/33; 385/39; 385/46; 385/47

(58) Field of Classification Search ............ 385/37
See application file for complete search history.

(56) References Cited

U.S. PATENT DOCUMENTS

| 5,002,350 | A | 3/1991 | Dragone |
| 5,136,671 | A | 8/1992 | Dragone |
| 6,112,000 | A * | 8/2000 | Bergmann et al. ............ 385/47 |
| 6,456,760 | B1 * | 9/2002 | Kurokawa et al. ............ 385/31 |
| 7,174,063 | B2 * | 2/2007 | Doerr et al. .................. 385/14 |
| 2003/0174951 | A1 * | 9/2003 | Doerr ......................... 385/37 |
| 2004/0151432 | A1 * | 8/2004 | Tabuchi et al. ............... 385/37 |
| 2004/0184153 | A1 * | 9/2004 | Neilson ...................... 359/566 |
| 2005/0089274 | A1 * | 4/2005 | Petermann et al. ........... 385/37 |

OTHER PUBLICATIONS

C.R.Doerr "Colorless Tunable Dispersion Compensator With 400-ps/nm Range Integrated With a Tunable Noise Filter", IEEE Photonics Technology Letters, vol. 15, No. 9, Sep. 2003.

* cited by examiner

*Primary Examiner*—Frank G. Font
*Assistant Examiner*—Ryan Lepisto

(57) ABSTRACT

A dispersion compensation apparatus providing both coarse and fine dispersion compensation employing a pair of slab waveguides, a grating interconnecting the two waveguides, a mirror disposed within the second slab waveguide and one or more thermooptic lense(s), positioned between the mirror and the grating.

12 Claims, 2 Drawing Sheets

DISPERSION COMPENSATION APPARATUS

FIELD OF THE INVENTION

This invention relates generally to the field of optical communications and in particular to a dispersion compensation apparatus with a large fixed dispersion and adjustable fine tuning.

BACKGROUND OF THE INVENTION

In long-distance transmission of optical signals, the accumulation of signal dispersion presents serious problems. These problems intensify with an increase in bit rate and the distance traveled by the optical signals. Efforts to date that compensate for dispersion have mainly involved the use of dispersion compensating fibers, filter-type dispersion compensating devices or a combination of both.

SUMMARY OF THE INVENTION

I have developed, in accordance with the principles of the invention, an optical dispersion compensation apparatus and accompanying method that—in addition to compensating for dispersion—permits the programmable fine tuning of the amount of dispersion compensation applied. It is therefore, a dispersion compensation module and a tunable dispersion compensator advantageously combined in a single device.

Advantageously, my inventive structures may be employed in a variety of optical transmission systems while minimizing the need for expensive, dispersion compensating fiber.

BRIEF DESCRIPTION OF THE DRAWING

A more complete understanding of the present invention may be realized by reference to the accompanying drawing in which.

DETAILED DESCRIPTION

Optical switching, multiplexing, and demultiplexing have been accomplished in the past by using an interconnection apparatus having one or more input waveguides communicating with the input of a star coupler. The output of the star coupler communicates with an optical grating comprising a series of optical waveguides, each of the waveguides differing in length with respect to its nearest neighbor by a predetermined fixed amount. The grating is connected to the input of a second star coupler. The second star coupler has one or more output waveguides which form the outputs of the switching, multiplexing, and demultiplexing apparatus. An example of such an interconnection apparatus is disclosed in U.S. Pat. Nos. 5,002,350 and 5,136,671, the entire contents and teachings of which are incorporated herein by reference.

The geometry of such an apparatus may be such that a plurality of separate and distinct wavelengths each launched into a separate and distinct input port of the apparatus will all combine and appear on a predetermined one of the output ports. In this manner, the apparatus performs a multiplexing function. The same apparatus may also perform a demultiplexing function. In this situation, a plurality of input wavelengths is directed to a predetermined one of the input ports of the apparatus. Each of the input wavelengths is separated from the others and directed to a predetermined one of the output ports of the apparatus. An appropriate selection of input wavelength also permits switching between any selected input port to any selected output port. Accordingly, these devices are referred to as frequency routing devices.

Figure 1:
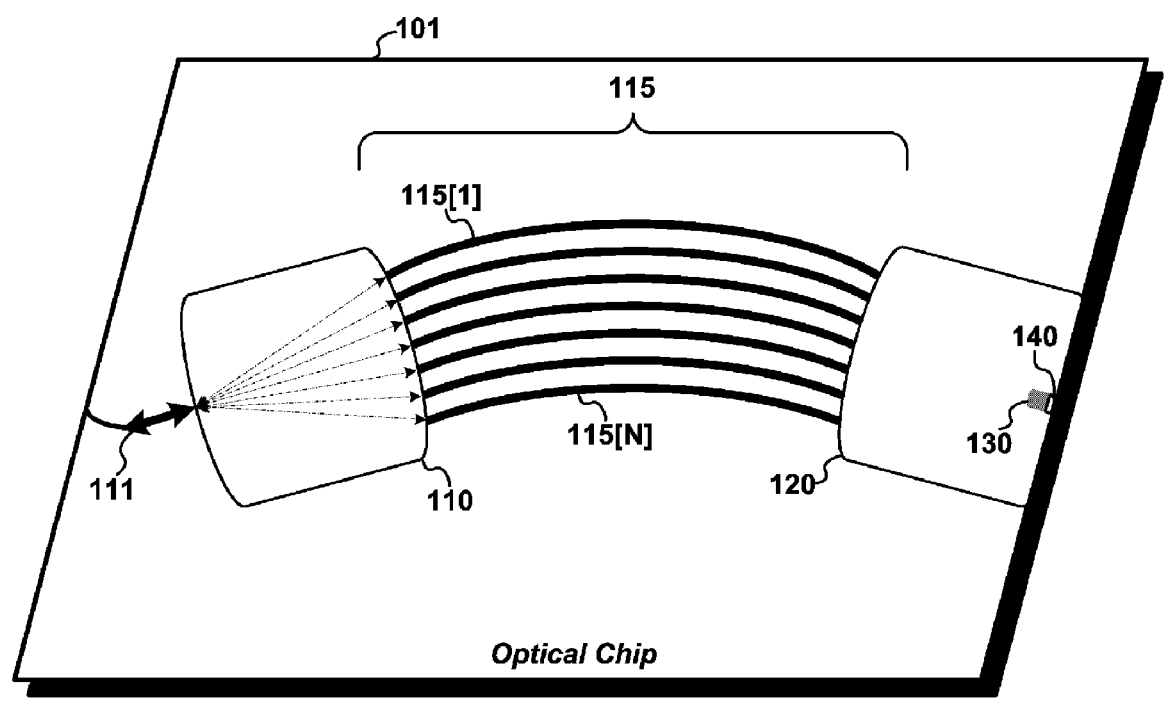
FIG. 1 shows a schematic of a dispersion compensation apparatus constructed according to the present invention.

Sharing some common elements with such frequency routing devices, FIG. 1 shows the pertinent details of my inventive dispersion compensation apparatus. The apparatus includes an input/output waveguide port 111 connected to an input circle of a free space region of a slab waveguide 110 (first star coupler).

A plurality of output ports extends from an output circle of the free space region of the slab waveguide 110 and is connected to an optical grating 115. The optical grating 115 comprises a plurality of unequal length waveguides 115[1] . . . 115[N] which provides a predetermined amount of path length difference to a corresponding plurality of input waveguides connected to an input circle of a free space region of another slab waveguide 120 (second star coupler).

At an opposite, output end of the slab waveguide 120, a mirror 140 is positioned at the focal plane (where output waveguides would be located in a frequency routing device). When positioned in this manner, portions of light input to input/output waveguide 111 traverses the first slab waveguide 110, the grating 115, the second slab waveguide 120, is reflected by the mirror 140, and subsequently output via input/output waveguide 120 having a majority of its accumulated dispersion compensated.

In a preferred embodiment, the mirror 140 is substantially flat, consequently it is relatively easy to fabricate and assemble. More particularly, it is generally easiest to cut and/or polish a flat surface, both for the optical chip 101 and for the mirror. When the mirror is flat, the device provides negative dispersion, which compensates the dispersion of most single-mode optical fibers, most notable standard single-mode fiber, which has a dispersion of ~+17 ps/nm/km in the C-band.

In some cases however, one may wish to place a quarter-wave plate between the optical chip and the mirror. This will cause transverse electric polarization to flip to transverse magnetic polarization and vice-versa upon reflection from the mirror and quarter-wave plate, reducing the polarization dependency of the dispersion compensator.

In a preferred embodiment, the mirror 140 will only be as wide as the central Brillouin zone. If the slab 120 has a radius is R, and the grating waveguide center-to-center spacing at the edge of slab 120 is a, then the central Brillouin zone width is $R\lambda/a$, where $\lambda$ is the central wavelength of the wavelength region that the dispersion compensator is expected to operate over.

With continued reference to FIG. 1, it can be seen that a thermooptic lens (for example, see U.S. patent application 20030174951 "Multichannel integrated tunable thermo-optic lens and dispersion compensator") 130 positioned between input ports of the second slab waveguide 120 and mirror 140, adjacent to mirror 140, advantageously provides additional dispersion compensation fine tuning to the structure.

Certain characteristics of such thermooptic lenses were disclosed in an article by C. R. Doerr entitled "Colorless Tunable Dispersion Compensator With 400-ps/nm Range Integrated With a Tunable Noise Filter", which appeared in IEEE Photonics Technology Letters, Vol. 15, No. 9, September 2003, the entire contents and teachings of which are incorporated herein by reference.

As can be appreciated, when the thermooptic lens 130 is turned OFF and the mirror is flat, the apparatus will exhibit a negative dispersion. The amount of dispersion in the lens-OFF state may be expressed as:

$$D_0 = -\frac{2Rf}{n(a\Delta f)^2}$$

Where f is the optical frequency, n is the refractive index, and $\Delta f$ is the grating free-spectral range.

Since the dispersion is large when the thermooptic lens 130 is OFF, (generally, no power applied) the application of power to the lens will provide fine tuning around this large value. In a preferred embodiment, there may be two interlaced or two stacked thermooptic lenses, one for positive tuning and one for negative tuning. Those skilled in the art will quickly recognize that such thermooptic lens structures may be integrated or hybrid integrated, such as a polymer thermooptic lens glued, or otherwise affixed.

Figure 2:
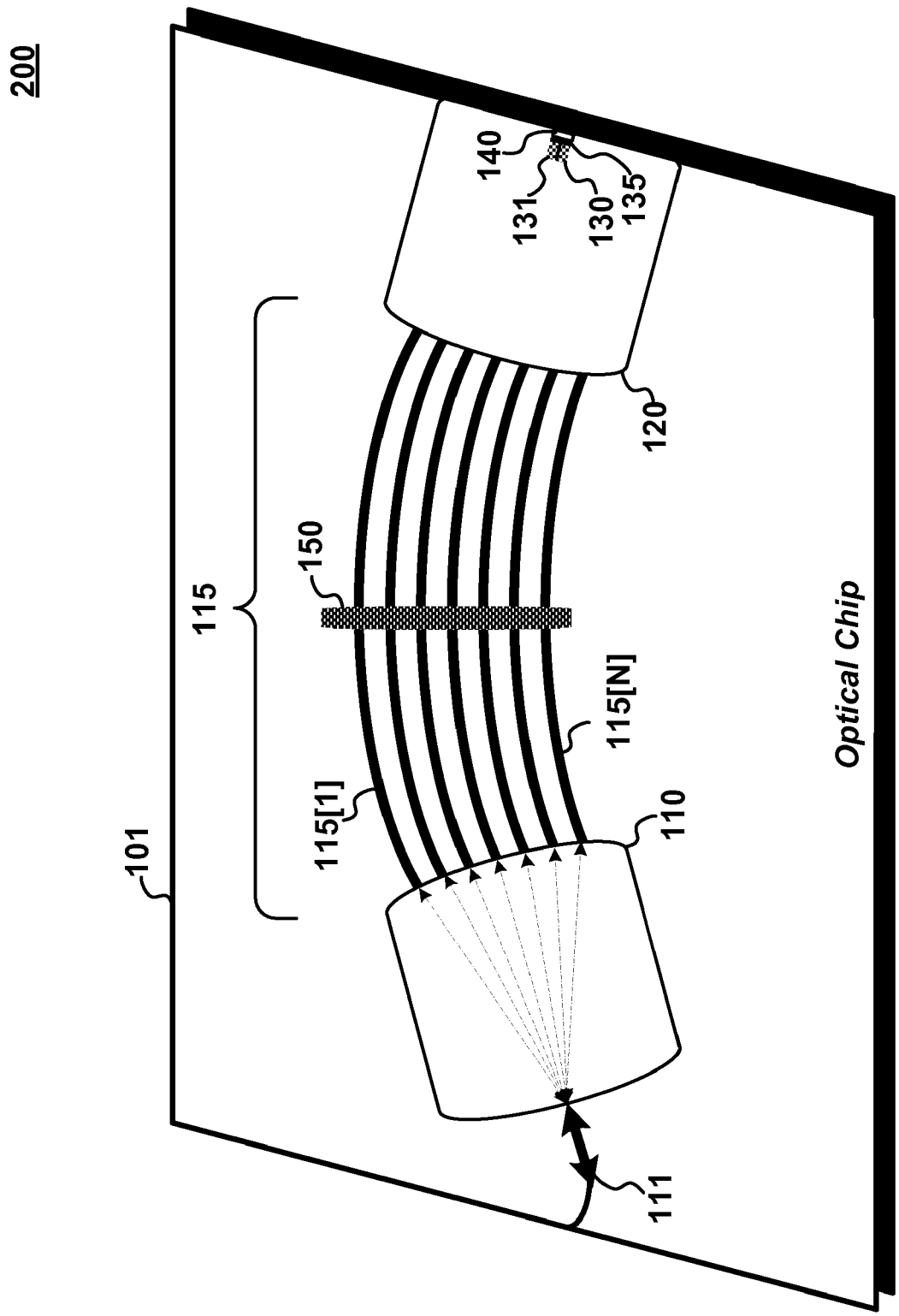
FIG. 2 shows a schematic of an alternative embodiment of the dispersion compensation apparatus of FIG. 1.

Turning now to FIG. 2, there is shown an alternative embodiment of my inventive structures, including a half-wave plate 150, disposed at substantially a mid-point of the grating 115, as well as two thermooptic lenses 130, 131, and a quarter-wave plate 135 inserted between the thermooptic lens and the mirror 140.

At this point, while I have discussed and described my invention using some specific examples, those skilled in the art will recognize that my teachings are not so limited. Accordingly, my invention should be only limited by the scope of the claims attached hereto.

What is claimed is:

1. An optical apparatus comprising:
   a first slab waveguide;
   a second slab waveguide; and
   a grating, optically interconnecting the first slab waveguide with the second slab waveguide;
   CHARACTERIZED IN THAT:
   the second slab waveguide includes a mirror, positioned at a focal point of a side of the waveguide opposite the grating and wherein the second slab waveguide includes at least two thermooptic lenses interposed between the mirror and the grating, one providing positive (+) dispersion compensation, the second providing negative (−) dispersion compensation.

2. The optical apparatus of claim 1, wherein the first slab waveguide includes an input/output waveguide, positioned on a side of the slab waveguide opposite the grating.

3. The optical apparatus of claim 1 wherein the grating includes a number of waveguides of predetermined unequal length.

4. The optical apparatus of claim 1 wherein the mirror is flat.

5. The optical apparatus of claim 1 wherein a half-wave plate is inserted in the center of the grating.

6. The optical apparatus of claim 1 wherein a quarter-wave plate is inserted between the thermooptic lens and the mirror.

7. The optical apparatus of claim 1, wherein its dispersion when the thermooptic lenses are powered off is −D, and the dispersion range when the thermooptic lenses are powered on is designed to be only within the range −2D to 0.

8. The optical apparatus of claim 1 wherein D is in the range of 1200 to 1600 ps/nm, the amount of dispersion encountered in a typical span in a fiber-optic system.

9. An optical apparatus comprising:
   a first slab waveguide;
   a second slab waveguide; and
   a grating, optically interconnecting the first slab waveguide with the second slab waveguide;
   CHARACTERIZED IN THAT:
   the second slab waveguide includes a mirror, positioned at a focal point of a side of the waveguide opposite the grating and a thermooptic lens, interposed between the mirror and the grating, wherein its dispersion when the thermooptic lens is powered off is −D, and the dispersion range when the thermooptic lens is powered on is designed to be only within the range −2D to 0.

10. The optical apparatus of claim 9 wherein D is in the range of 1200 to 1600 ps/nm, the amount of dispersion encountered in a typical span in a fiber-optic system.

11. The optical apparatus of claim 9 wherein a half-wave plate is inserted in the center of the grating.

12. The optical apparatus of claim 9 wherein a quarter-wave plate is inserted between the thermooptic lens and the mirror.

* * * * *